US011317031B2

United States Patent
Baldwin

(10) Patent No.: US 11,317,031 B2
(45) Date of Patent: Apr. 26, 2022

(54) HIGH INTENSITY PATTERN PROJECTION AND GENERAL ILLUMINATION USING ROLLING SHUTTER CAMERA AND A SYNCHRONIZED SCANNING LASER

(71) Applicant: Amazon Technologies, Inc., Seattle, WA (US)

(72) Inventor: Leo Benedict Baldwin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/835,190

(22) Filed: Mar. 30, 2020

(65) Prior Publication Data

US 2021/0306541 A1  Sep. 30, 2021

(51) Int. Cl.
| | | |
|---|---|---|
| *H04N 5/235* | (2006.01) | |
| *G06T 7/521* | (2017.01) | |
| *G01S 7/481* | (2006.01) | |
| *G01S 7/484* | (2006.01) | |
| *G01S 17/89* | (2020.01) | |

(52) U.S. Cl.
CPC ............ *H04N 5/2352* (2013.01); *G01S 7/484* (2013.01); *G01S 7/4817* (2013.01); *G01S 17/89* (2013.01); *G06T 7/521* (2017.01); *G06T 2207/10028* (2013.01)

(58) Field of Classification Search
CPC ..... H04N 5/2352; G06T 7/521; G01S 7/4817; G01S 7/484; G01S 17/89
See application file for complete search history.

(56) References Cited

U.S. PATENT DOCUMENTS

| | | | |
|---|---|---|---|
| 2008/0212453 A1* | 9/2008 | Miyazawa | G11B 7/00456 369/116 |
| 2017/0180654 A1* | 6/2017 | Swaminathan | H04N 13/254 |
| 2018/0038961 A1 | 2/2018 | Smits | |
| 2018/0288388 A1 | 10/2018 | Hicks | |
| 2018/0374230 A1* | 12/2018 | Narasimhan | G01B 11/245 |
| 2019/0075281 A1* | 3/2019 | Hall | G06F 3/0325 |
| 2019/0149805 A1 | 5/2019 | Shpunt et al. | |
| 2020/0096640 A1 | 3/2020 | Atanassov et al. | |

OTHER PUBLICATIONS

European Partial Search Report and Provisional Opinion for Application No. PCT/US2021/023160 dated Jun. 24, 2021.
PCT, Notification of Transmittal of the International Search Report and the Written Opinion of the International Searching Authority, or The Declaration for Application PCT/US2021/023160 dated Oct. 4, 2021.

\* cited by examiner

*Primary Examiner* — Hesham K Abouzahra
(74) *Attorney, Agent, or Firm* — Patterson + Sherdan, LLP

(57) ABSTRACT

An imaging system for general illumination and range imaging in strong ambient illumination conditions includes a light source, at least one image sensor with a rolling shutter, a steering device, and a controller. The light source transmits laser pulses with a structured pattern towards a scene. The steering apparatus spatially directs each of the laser pulses towards a different region of interest within the scene. The image sensor receives reflected laser pulses, via the rolling shutter, from the different regions of interest. The controller triggers the image sensor to read each of the pixels in the image sensor with the rolling shutter at a time instance when one of the laser pulses having the structured pattern is reflected onto the pixel from one of the different regions of interest.

20 Claims, 13 Drawing Sheets

HIGH INTENSITY PATTERN PROJECTION AND GENERAL ILLUMINATION USING ROLLING SHUTTER CAMERA AND A SYNCHRONIZED SCANNING LASER

BACKGROUND

The present invention relates to imaging systems, and more specifically, to imaging systems for range imaging and general illumination using a rolling shutter camera and a synchronized scanning laser.

Outdoor imaging systems are being increasingly used in a variety of different applications, such as automotive applications, smartphone cameras, topography mapping, robotics, etc. These imaging systems can employ various ranging techniques for terrestrial mapping, target detection and recognition, obstacle detection and avoidance, etc. For example, such techniques can include, but are not limited to, time of flight (ToF) camera systems, light detection and ranging (LIDAR) (also referred to as LiDAR and LADAR), active stereo camera systems, etc. One challenge with these ranging systems, however, is that they are generally susceptible to strong ambient illumination (e.g., in outdoor scenarios). Strong ambient illumination (e.g., from the sun), for example, can significantly degrade the performance of these ranging systems by limiting the effective range of the systems, impacting the quality of reconstructed images from the systems, etc.

BRIEF DESCRIPTION OF DRAWINGS

Various embodiments in accordance with the present disclosure will be described with reference to the drawings, where like designations denote like elements.

DETAILED DESCRIPTION

Figure 1:
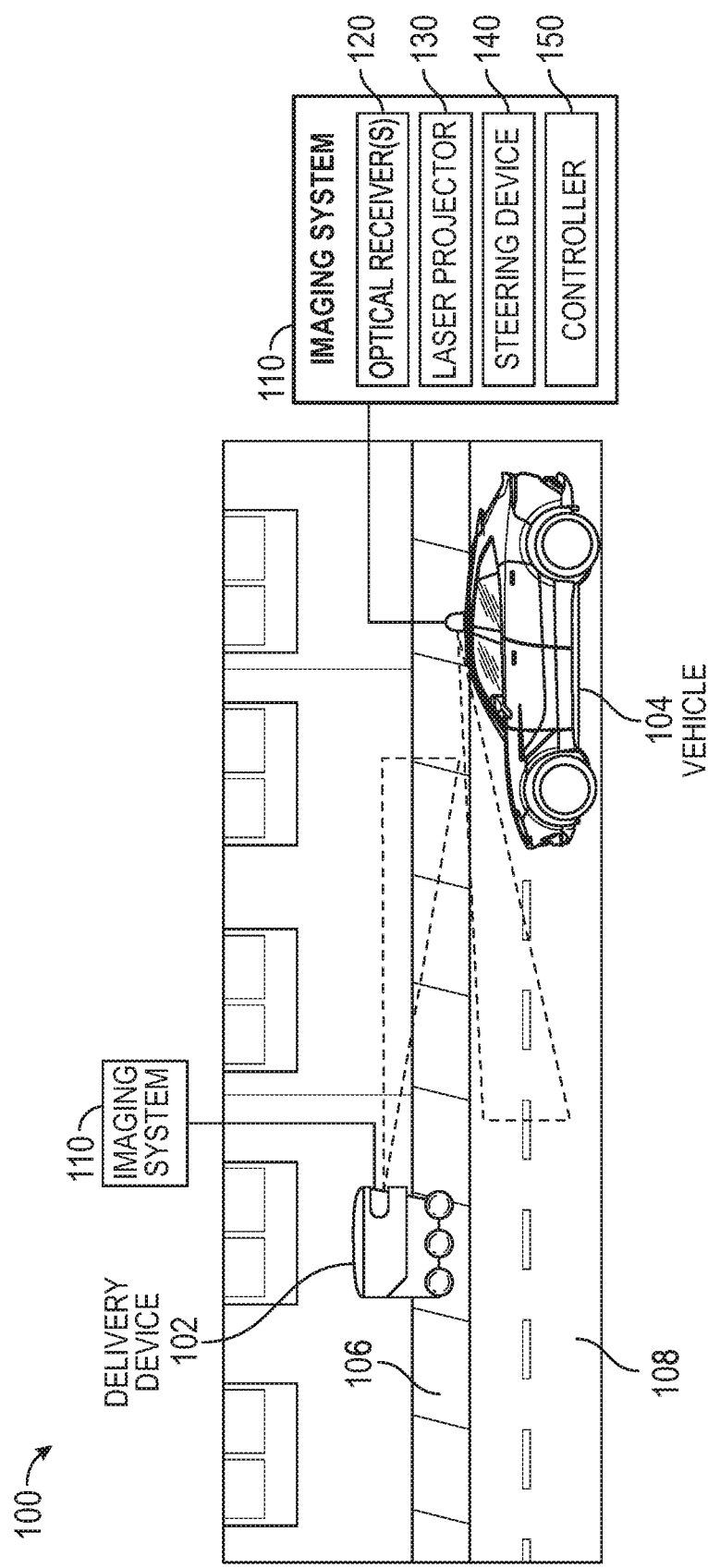
FIG. 1 illustrates an example environment in which one or more imaging systems for ranging and general illumination are deployed, according to one embodiment.

Imaging systems are increasingly being deployed in outdoor environments for applications such as navigation, obstacle detection, etc. When used in such environments, however, these imaging systems typically have to compete with strong ambient illumination. For example, in some cases, the power from sunlight can often be orders of magnitude larger than the light (e.g., laser, light emitting diode (LED), etc.) emitted from an imaging system. Consequently, in imaging systems that employ image sensors with limited dynamic range, the (reflected) light that is captured by the image sensors can be significantly low, impacting the range and precision of the imaging system. For example, at large distances (e.g., above a few meters), the active illumination from the imaging system can be overcome by the ambient illumination from the sun.

Conventional techniques that attempt to mitigate the ambient illumination in outdoor environments are generally ineffective and cost-prohibitive. For example, one conventional technique that can be used to mitigate the effects of ambient illumination involves increasing the power of the light source within the imaging system. In many situations, however, this may not be possible or practical (e.g., imaging systems may be low cost systems and/or operate on a limited power budget, imaging systems may be restricted to using eye-safe laser sources, etc.). Other conventional techniques involve using spectral filtering and/or temporal filtering to increase the effective range of the imaging system in ambient conditions. Spectral filtering generally involves using an optical filter to restrict unwanted wavelengths and admit desired wavelengths. Temporal filtering generally involves strobing the laser source in short pulses and using a shutter in the imaging system to admit only those short pulses. However, in many cases, spectral filtering and temporal filtering can be inadequate, as the ambient illumination in outdoor environments can still significantly limit the range of imaging systems employing these conventional techniques.

Accordingly, embodiments described herein provide an imaging system that can obtain a significantly higher range in environments (e.g., outdoor environments) with strong ambient illumination. The imaging system can be used for general illumination and/or range detection. As described in more detail below, the imaging system described herein can mitigate the effects of strong ambient illumination by using a synchronized laser projector and image sensor(s) with rolling shutter(s) to implement spatial filtering.

For general illumination scenarios, for example, the imaging system can use the laser projector to project (or emit) a structured light pulse (or pattern) onto a particular region of interest within a scene (or target). That is, the imaging system can control the laser projector, such that its field of view covers the approximate area of a single pixel (as opposed to covering the entire scene) at each time instance. Similarly, the imaging system controls the scan rate of the rolling shutter, such that the image sensor captures the reflected light from the particular region of interest targeted by the laser projector at that time instance. Thus, in embodiments described herein, the imaging system can synchronize the structured light pulses output from the laser projector and the rolling shutter, such that each pixel scanned by the rolling shutter captures a reflected structured light pattern. By synchronizing the laser projector and rolling shutter to scan a scene pixel by pixel in this manner, embodiments provide an imaging system that can achieve significantly higher illumination intensities (e.g., compared to conventional imaging systems that use global shutters for illumination applications).

For range imaging scenarios, the imaging system can implement an active stereo structured light system to improve the range of detection of objects (e.g., in cases of strong ambient illumination). In this embodiment, the imaging system uses a laser projector to project a structured light pulse onto a different region of interest within the scene (e.g., as opposed to covering the entire scene) at each time instance. Each region of interest, for example, may be approximately equal to the area of a set of pixels. While projecting the region of interest with the structured light pulse, the imaging system controls the rolling shutters of two image sensors to scan the reflected light from the region of interest pixel by pixel from two vantage points (or perspectives). In one embodiment, the rolling shutter can scan structured light reflected from the region of interest pixel by pixel, while the laser projector uses the same scanning pattern within the region of interest. In this manner, embodiments provide an imaging system that can achieve higher exposure values at the same illumination power and/or greater range in strong ambient illumination without increasing eye exposure limits.

Note that while some embodiments are described herein with reference to using imaging systems for autonomous vehicles (e.g., delivery robots, driverless cars, etc.), such examples are provided for illustrative purposes only and without limitation. In other embodiments, the imaging systems described herein can be used for a wide range of applications, including, but not limited to, robotics, navigation, obstacle detection and avoidance, topography mapping, etc. Similarly, while many of the embodiments are described with reference to outdoor environments, note that the embodiments described herein can be implemented in indoor environments.

FIG. 1 illustrates an example environment 100 in which one or more imaging systems described herein can be implemented, according to one embodiment. Here, the environment 100 is an outdoor environment in which a delivery device 102 is moving on a sidewalk 106 and a vehicle 104 is moving on a road (or street) 108. As used herein, a delivery device may also be referred to as an autonomous ground vehicle (AGV), robot, personal delivery device, etc. Similarly, as used herein, a vehicle may also be referred to as a self-driving car, autonomous vehicle (AV), driverless car, robo-car, robotic car, etc. In some cases, the vehicle 104 may be fully autonomous. In other cases, the vehicle 104 may have one or more autonomous capabilities (e.g., capable of moving safely with little or no human input). Note that while environment 100 depicts a sidewalk 106 and road 108, embodiments are not limited to these types of terrain. In general, embodiments can be used in locations that have a variety of shapes, sizes, surface materials, and/or other properties.

In this embodiment, the delivery device 102 and the vehicle 104 each include an imaging system 110. The imaging system 110 can be used for a variety of applications, including, but not limited to, general illumination (e.g., illuminating a scene to capture an image), range imaging (e.g., for obstacle detection and avoidance, navigation, 3D mapping, etc.), etc. Compared to conventional imaging systems, the imaging systems 110 can achieve higher illumination intensities and higher range detections in strong ambient illumination situations. Here, the imaging system 110 includes one or more optical receivers 120, a laser projector 130, a steering device 140, and a controller 150, each of which can include hardware components, software modules, or combinations thereof.

The optical receiver 120 is generally configured to detect an incoming optical signal (e.g., reflected light from a scene or target) and extract information from the optical signal. The optical receiver 120 can include optical sensor(s) (e.g., image sensors), rolling shutter(s), logic components, and various circuitry to control or assist with controlling the optical sensor(s) and rolling shutter(s) to control aspects of image acquisition. The optical receiver 120 can use various types of image sensors, including, for example, charged coupled device (CCD) image sensors, complementary metal-oxide-semiconductor (CMOS) image sensors, etc.

The laser projector 130 (or, more generally, a light/laser source(s)) is configured to transmit (or emit or output or project) a light pulse (or beam) towards a scene. The light pulse, for example, may include a laser pulse, LED pulse, etc. More generally, a light pulse may also be referred to as a beam, an optical pulse, an optical signal, an optical waveform, etc. In some embodiments, the laser projector 130 can include a single laser source. In other embodiments, the laser projector 130 can include a switched array of laser sources (e.g., a phased array laser system). In embodiments herein, the light pulse output from the laser projector 130 may have a structured light pattern. The structured light patterns can include point structured light, line structured light, phase-coded structured light, etc. These structured light patterns can be detected by the optical receiver 120 and used to determine range (or depth) information of a scene. In some cases, the laser projector 130 can be an eye-safe laser source. That is, the laser projector 130 may have a maximum permissible exposure (MPE) depending on its operating spectral region and pulse length. The laser projector 130 may have a field of view (FOV) that covers a particular region of interest of a scene. For example, in some cases, the laser projector 130 may have a FOV that covers the approximate area of a single pixel (e.g., one of the pixels used in the optical receiver 120). In other cases, the laser projector 130 may have a FOV that covers the approximate area of a set of pixels (e.g., a set of pixels used in the optical receiver 120).

The steering device 140 is generally used to control (or steer) the laser pulses (or beams) emitted from the laser projector 130 towards different regions of a scene. The steering device 140 can include hardware components (e.g., one or more optical lenses, optical mirrors, circuitry, etc.) and/or software (logic) components. The steering device 140 can use a variety of optical devices (or a combination of optical devices) to steer (or sweep) the structured laser pulse emitted from the laser projector 130 across different regions of the scene. For example, such optical devices can include galvanometer (galvo) mirrors, rotating mirrors, acousto-optic deflectors (AODs), scanning lens, etc. The optical devices may be configured, such that the light pulses reflected from a given region of interest of a scene are directed to one or more pixels of the optical receiver 120.

The controller 150 generally controls operation of one or more components (e.g., optical receiver 120, laser projector 130, steering device 140, etc.) of the imaging system 110. The controller 150 can include hardware components, software components, or combinations thereof. Although not shown, the controller 150 can include clock circuitry, pulse (generator) circuitry, driver circuitry, and/or similar control components to trigger operation of component(s) of the imaging system 110. In one embodiment, the controller 150 provides control signals (or commands) to synchronize operation of various components of the imaging system 110. For example, the controller 150 can trigger the laser projector 130 to transmit a structured light pulse towards a scene. The controller 150 generally can configure the repetition, rate, energy, and duration of the structured light pulse that is output from the laser projector 130.

Similarly, the controller 150 can control the steering device 140 to allow the structured light pulse to be focused on particular region of the scene. For example, the controller 150 may apply signals to control a scan or sweep rate of the structured light pulse across a scene. Further yet, the controller 150 can control the manner (e.g., rate) in which a scene is scanned by the optical receiver 120. In one embodiment, the controller 150 can synchronize the scanning rate of the optical receiver 120 with the sweeping rate of the structured light pulse output from the laser projector 130.

For example, in one embodiment described in more detail with respect to FIGS. 2 and 3A-3D, the controller 150 can control the optical receiver 120, laser projector 130, and steering device 140, such that the optical receiver 120 scans each pixel of an image sensor to capture a reflected structured light pulse (e.g., reflected from a particular region of interest targeted by the laser projector 130 with a structured light pulse) directed towards that pixel. In another embodiment described in more detail below with respect to FIGS. 6 and 7A-7I, the controller 150 can control the optical receiver 120, laser projector 130, and steering device 140, such that the optical receiver 120 scans multiple regions of pixels of an image sensor, pixel by pixel, while a same reflected structured light pulse pattern is directed towards the multiple regions of pixels.

Note that FIG. 1 depicts merely an example of an imaging system 110 that can be used for a given environment 100. For example, in some embodiments, one or more of the components of the imaging system 110 can be combined into a single component (e.g., the laser projector 130 and the steering device 140 can be combined into a single component).

Figure 2:
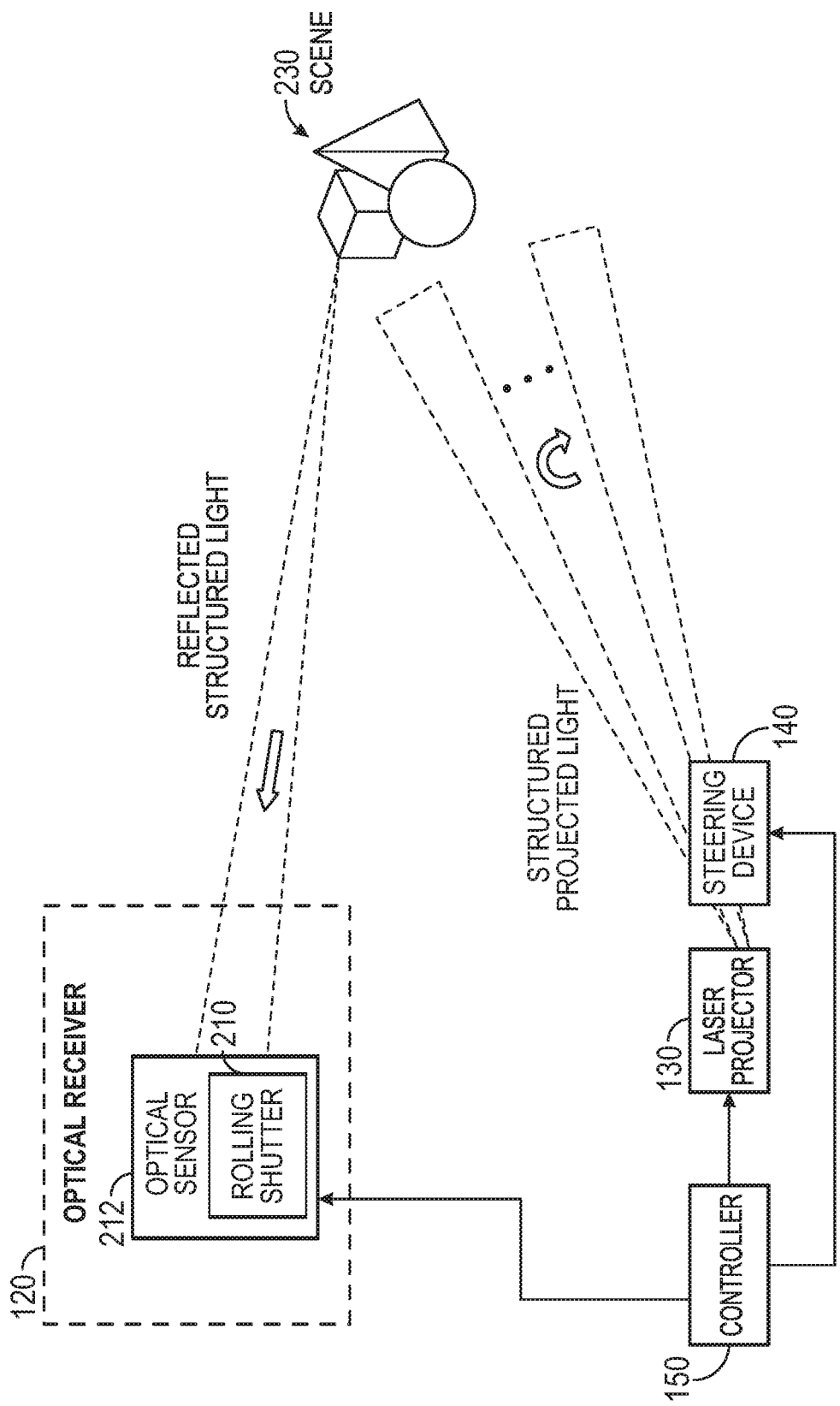
FIG. 2 is a block diagram of an example imaging system, according to one embodiment.

FIG. 2 is a block diagram of an imaging system 110, according to one embodiment. In one embodiment, the imaging system 110 depicted in FIG. 2 can be used for general illumination applications (e.g., increasing an amount of illumination captured by an image sensor), according to one embodiment. Here, the optical receiver 120 includes an optical sensor 212, which includes a rolling shutter 210.

The optical sensor 212 generally converts light rays into electrical signals. In one embodiment, the optical sensor 212 is an image (e.g., camera) sensor that acquires image information from reflected light of a scene 230 onto a set of pixels (e.g., pixel grid (or array)). As noted, the optical sensor 212 can include CMOS sensors, CCD sensors, etc. The optical sensor 212 can use the rolling shutter 210 to capture an image of a scene by scanning across the pixel grid (e.g., pixel by pixel). The rolling shutter 210 can scan vertically or horizontally. For example, the rolling shutter 210 can scan a scene sequentially from one side of the optical sensor 212 to the other side of the optical sensor 212, line by line. Referring to the pixel grid (or region) 340 in FIG. 3A, the rolling shutter 210 may scan the pixels in each row sequentially. The rolling shutter 210 can start with the pixel at (R1, C1) and scan each pixel in R1; then proceed to scan each pixel in the second row (R2) starting with the pixel at (R2, C1); then proceed to scan each pixel in the third row (R3) starting with the pixel at (R3, C1); and so on, until the pixel at (R8, C11) is scanned. Note, that while the above describes a horizontal scan, the rolling shutter 210 can be configured to perform a vertical scan (e.g., scanning the pixels in each column of pixels sequentially).

The controller 150 may apply electrical signals (e.g., control and clock signals) to the laser projector 130, steering device 140, optical sensor 212, and rolling shutter 210. As shown, the controller 150 triggers the laser projector 130 to emit a structured light pulse towards a particular region of interest of the scene 230, which may include one or more objects located at different distances to the imaging system 110. The controller 150 also triggers the steering device 140 to control the manner in which the structured light pulse is projected onto the scene 230. For example, the controller 150 may control the steering device 140 to scan the structured light pulse onto different regions of interest at different time instances. In this embodiment, the steering device 140 may be configured to focus the structured light pulse, such that it is reflected onto a different pixel of the optical sensor 212 at the time instance that the respective pixel is scanned by the optical sensor 212.

In one embodiment, the sweep rate of the steering device 140 may be based in part on the configuration of the optical receiver 120 and/or the configuration of the laser projector 130. For example, the sweep (or scan) rate of the steering device 140 may be based in part on the scan rate of the optical receiver 120 and/or the FOV of the laser projector 130. In the embodiment depicted in FIG. 2, the steering device 140 may be synchronized with the optical receiver 120, such that the optical receiver 120 scans a different pixel at the time instance that the structured light pulse is reflected onto that pixel.

In some cases, the steering device 140 may have to achieve a high angular scan rate (e.g., sufficient to keep pace with the scan rate of the optical receiver 120) and/or a linear scan rate (e.g., the scan is linear in angular velocity (degrees per second)). In one embodiment, the steering device 140 can employ rotating mirrors to achieve a scan that meets both (1) the desired angular scan rate and (2) is linear in angular velocity. In another embodiment, the steering device 140 can employ an AOD to achieve the desired angular scan rate and angular scan rate linearity. In this embodiment, the steering device 140 can employ a scanning lens in addition to the AOD to magnify the scanning angle in order to target the individual pixels at a linear angular velocity.

In one embodiment, the steering device 140 can employ a non-linear scanning system and one or more anamorphic (or astigmatic) optical system(s) (a lens or mirror or diffractive optical element or combinations thereof) that corrects the non-linear output of the non-linear scanning system, such that the scan velocity is linear from the output of the anamorphic optical system. In one example, the scanning system can include a two-axis mirror system. In this example, the two-axis mirror system can include the same type of mirrors for both axes (e.g., two galvo mirrors) or different types of mirrors for the different axes (e.g., a spinning mirror for a first axis and a galvo mirror for the second axis). When the scanning system is non-linear, the steering device 140 can use the anamorphic optical system to adjust the magnification of the angles output from the scanning system, so that the scan velocity is linear out in object space.

FIGS. 3A-3D illustrate an example sweep pattern of an imaging system 110 for a pixel grid 340, according to one embodiment. The pixel grid 340 may be included as part of the optical sensor 212. In one embodiment, the sweep pattern depicted in the sequence of FIGS. 3A-3D can be used to achieve higher illumination intensities (e.g., compared to a global shuttered imaging system operating at the same power). In this embodiment, the structured light pattern 304 is reflected onto each individual pixel 302 (via the laser projector 130/steering device 140), while the individual pixel 302 is being scanned by the optical receiver 120.

Figure 3A:
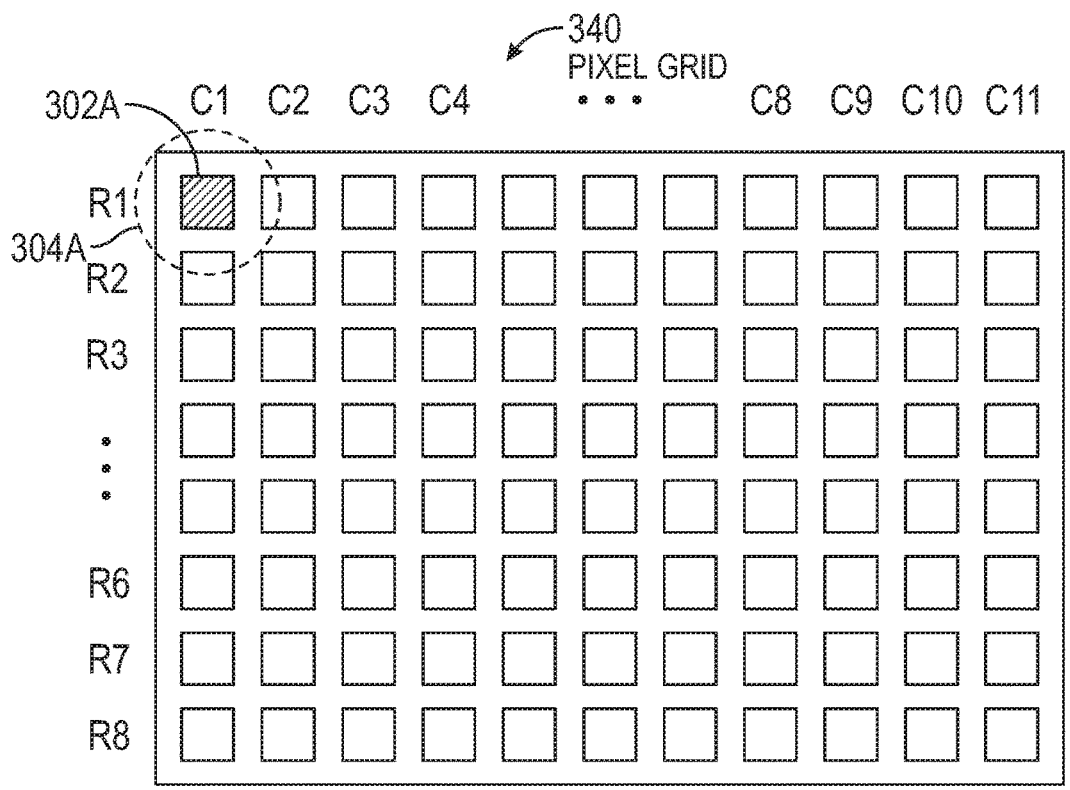
FIGS. 3A-3D illustrate an example sweep pattern of an imaging system across a scene, according to one embodiment.
Figure 3B:
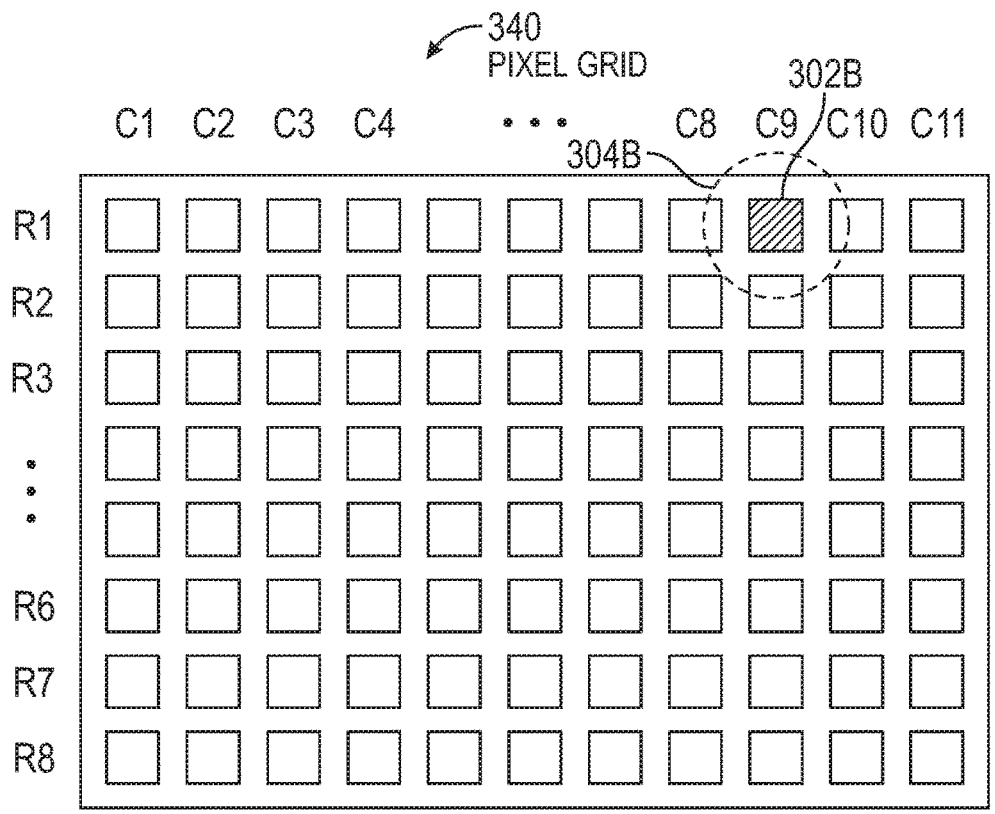

As shown in FIG. 3A, for example, the imaging system 110 begins scanning the pixels row by row, pixel by pixel. The imaging system 110 initially scans pixel 302A within the first row (R1), while the structured light pattern 304A is reflected onto the pixel 302A. The imaging system 110 continues this scanning process, scanning each individual pixel in the first row (R1) in a sequential manner while also controlling the sweep of the structured laser pulse so that the structured light pattern 304 is reflected onto the pixel at the same time instance that pixel is scanned. For example, as shown in FIG. 3B, at a subsequent time instance, the imaging system 110 scans pixel 302B within the first row (R1), while the structured light pattern 304B is reflected onto the pixel 302B.

Figure 3C:
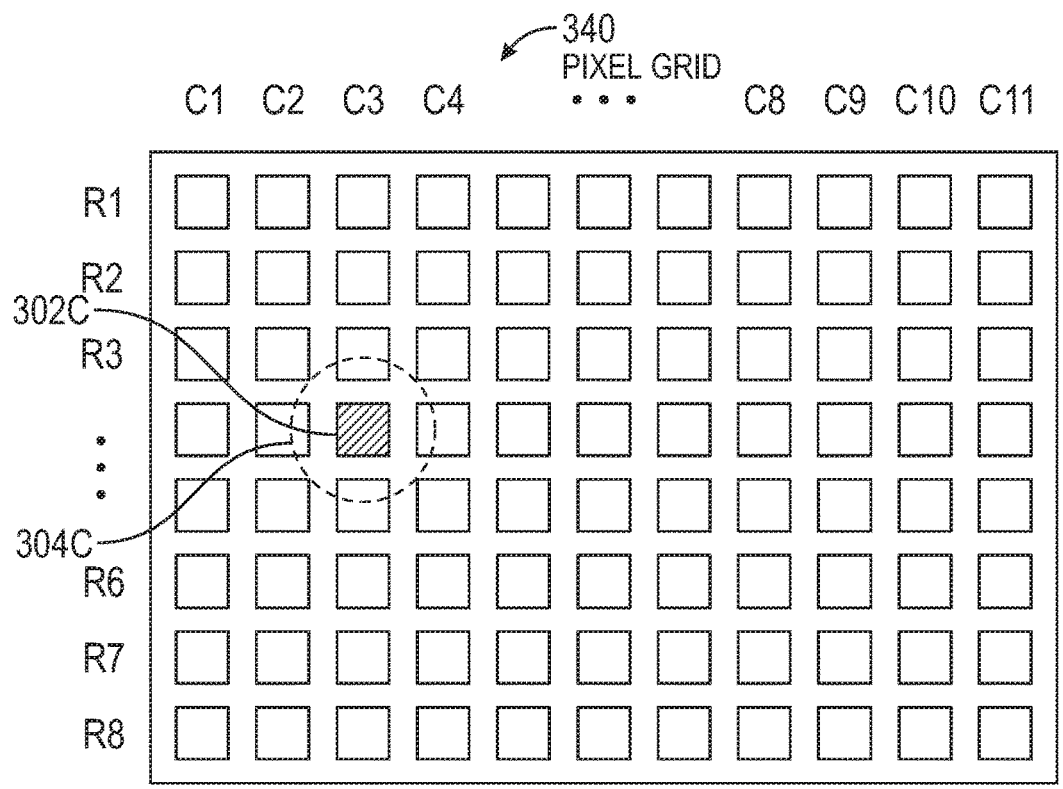
Figure 3D:
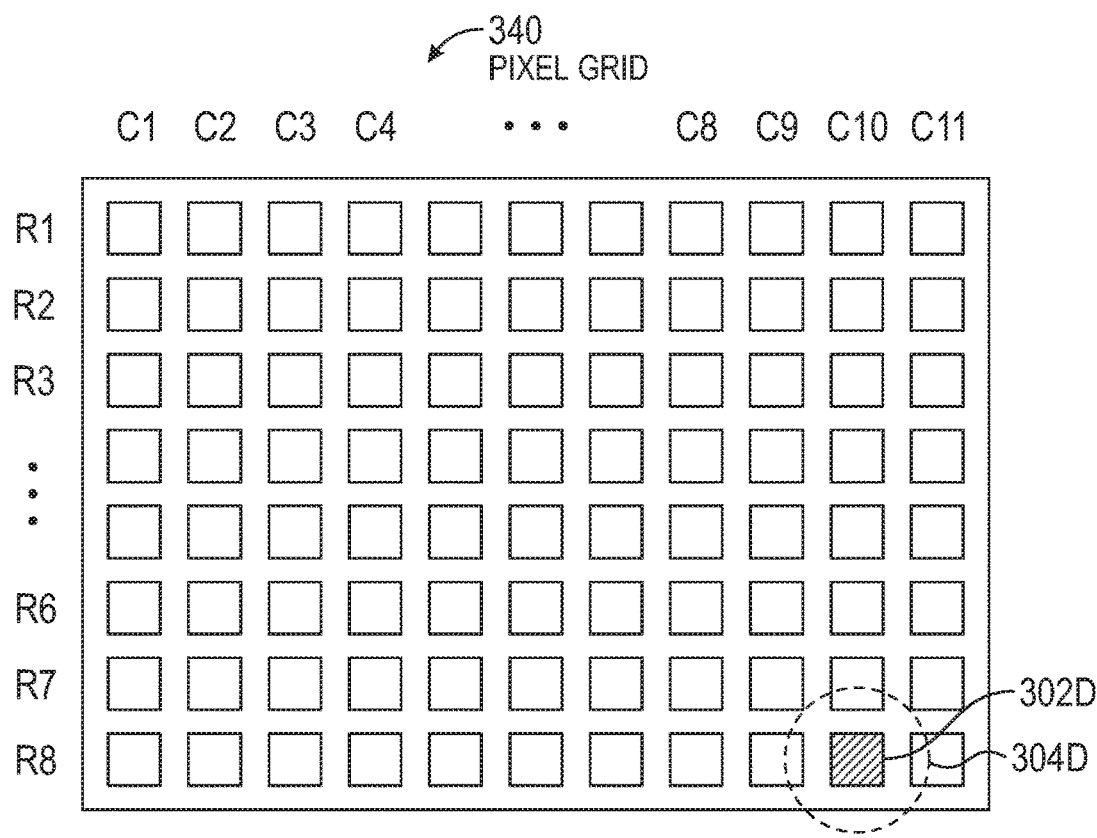

Subsequently, as shown in FIG. 3C, the imaging system 110 scans pixel 302C within the fourth row (R4), while the structured light pattern 304C is reflected onto the pixel 302C. Subsequently, as shown in FIG. 3D, the imaging system 110 scans pixel 302D within the eight row (R8), while the structured light pattern 304D is reflected onto the pixel 302D. The imaging system 110 may continue this scanning process until the last pixel of the last row (e.g., pixel at (R8, C11)) is scanned.

Figure 4:
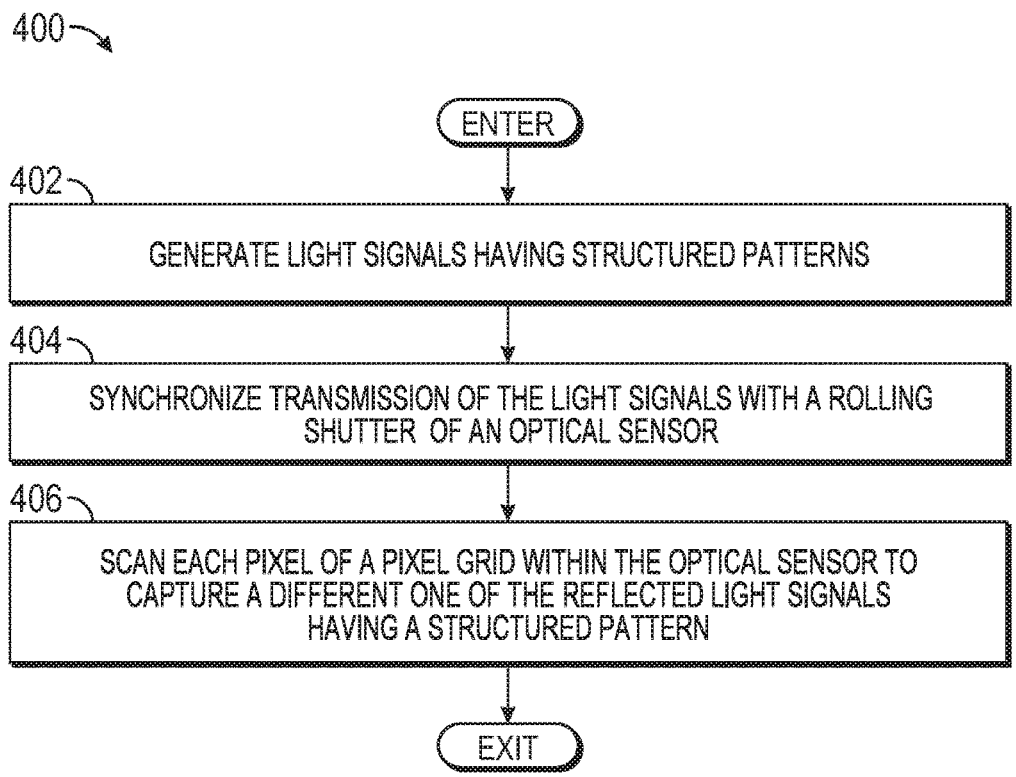
FIG. 4 is a flowchart of a method for illuminating a scene using an imaging system with a rolling shutter and synchronized laser projector, according to one embodiment.

FIG. 4 is flowchart of a method 400 for illuminating a scene using an imaging system with a rolling shutter and synchronized laser projector, according to one embodiment. The method 400 may be performed by the imaging system (e.g., imaging system 110).

Method 400 may enter at block 402, where the imaging system generates one or more light signals having structured patterns. For example, the imaging system can use the laser projector 130 to generate a sequence of structured light pulses having particular structured patterns (e.g., spot, dot, line, etc.). At block 404, the imaging system synchronizes transmission of the light signals with a rolling shutter (e.g., rolling shutter 210) of an optical sensor (e.g., optical sensor 212). At block 406, the imaging system scans each pixel of a pixel grid (e.g., pixel grid 340) (e.g., sequentially) within the optical sensor to capture a different one of the reflected light signals having a structured pattern.

Figure 5:
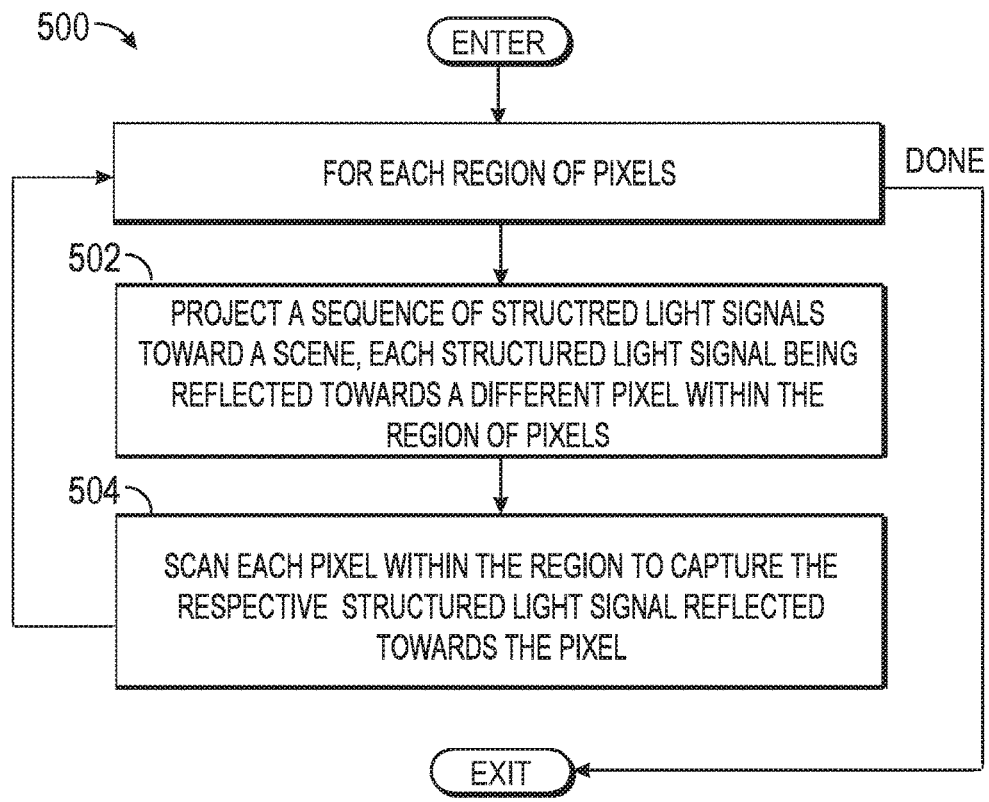
FIG. 5 is a flowchart of another method for illuminating a scene using an imaging system with a rolling shutter and synchronized laser projector, according to one embodiment.

FIG. 5 is a flowchart of another method 500 for illuminating a scene using an imaging system with a rolling shutter and synchronized laser projector, according to one embodiment. The method 500 may be performed by the imaging system (e.g., imaging system 110) for each region of pixels (e.g., horizontal row of pixels) within a pixel grid (e.g., pixel grid 340) of an optical sensor (e.g., optical sensor 212).

At block 502, the imaging system projects a sequence of structured light signals toward a scene (e.g., scene 230). Each structured light signal is reflected from the scene towards a different pixel within the region of pixels. The region of pixels can include a horizontal region of pixels (e.g., a row of pixels within the pixel grid) or a vertical region of pixels (e.g., a column of pixels within the pixel grid).

As noted above, the imaging system can use a steering device (e.g., steering device 140) to target a particular region of interest within the scene. The region of interest may be approximately equal to a single pixel of the optical sensor. For example, the imaging system (and, in particular, the laser projector 230) may have a FOV approximately equal to a single pixel of the optical sensor of the imaging system. The imaging system can focus the structured light signal on one or more angle positions that can be aligned with the optical sensor of the imaging system. At block 504, the imaging system scans each pixel within the region to capture the respective structured light signal reflected towards the pixel. The method then proceeds to the next region of pixels until each region of pixels is scanned by the imaging system.

Figure 6:
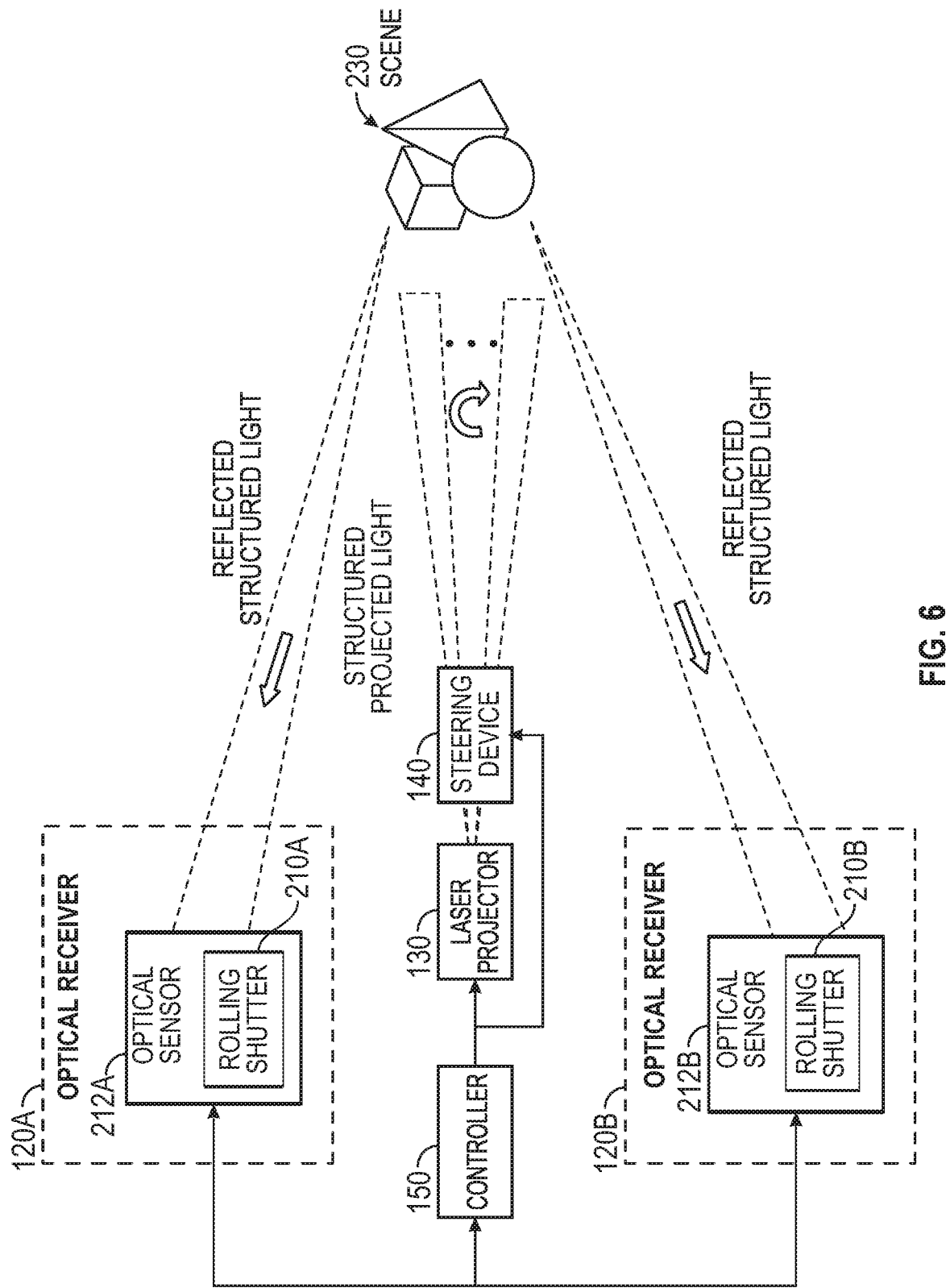
FIG. 6 is a block diagram of another example imaging system, according to one embodiment.

FIG. 6 is a block diagram of another example imaging system 110, according to one embodiment. In one embodiment, the imaging system 110 depicted in FIG. 6 can be used for range imaging applications (e.g., range detection, obstacle avoidance, etc.), according to one embodiment. Here, the imaging system 110 implements a stereo structured light technique to detect range of objects within a scene. For example, compared to the imaging system 110 depicted in FIG. 2, in this embodiment, the imaging system 110 includes two optical receivers 120A and 120B. Each optical receiver 120A and 120B includes a respective optical sensor 212A and 212B. Each optical sensor 212A and 212B includes a respective rolling shutter 210A and 210B, which are discussed in more detail above.

In this system, once structured projected light is emitted from the laser projector 130 towards the scene 230, the reflected structured light from the scene 230 is captured by the optical receivers 120A and 120B from two vantage points. The pixel information from each of the optical sensors 212A and 212B can be processed by the controller 150 to determine range information of the scene 230. In one embodiment, the imaging system 110 depicted in FIG. 6 can be used for edge detection, which generally involves detecting and locating discontinuities and changes in pixel values within an image. The controller 150 can use a variety of algorithms for edge detection, including, for example, Gradient based edge detection algorithms and Laplacian based edge detection algorithms.

In this embodiment, the controller 150 may apply electrical signals (e.g., control and clock signals) to the laser projector 130, steering device 140, optical sensors 212A, 212B, and rolling shutters 210A, 210B. The controller 150 may synchronize operation of the laser projector 130/steering device 140 with the operation of the optical receivers 120A, 120B. For example, the controller 150 can trigger the laser projector 130 to emit a structured light pulse towards the scene 230 and trigger the steering device 140 to control the manner in which the structured light pulse is projected onto the scene 230. For example, the steering device 140 can be controlled sweep the structured light pulse across different regions of interest within the scene 230 at different time instances.

Here, in particular, the steering device 140 may be configured to focus each structured light pulse, such that it is reflected onto a different set of pixels (within a region of pixels) of the optical sensors 212A, 212B while the pixels within the region of pixels are being scanned (e.g., pixel by pixel) by the optical sensors 212A, 212B. Similar to FIG. 2, the sweep rate of the steering device 140 may be based in part on the scan rates of the optical receivers 120A and 120B.

FIGS. 7A-7I illustrate an example sweep pattern of an imaging system 110 for a pixel grid 740. The pixel grid 740 may be included as part of one of the optical sensors (e.g., optical sensor 212A. For the sake of clarity, the sweep pattern for a single pixel grid 740 is shown. Those of ordinary skill in the art will recognize that a similar sweep pattern can be used for the pixel grid within the other optical sensor (e.g., optical sensor 212B) of the imaging system depicted in FIG. 6. In one embodiment, the sweep pattern depicted in the sequence of FIGS. 7A-7I can be used to achieve higher exposure values for pixels of the optical sensor in strong ambient illumination (e.g., at the same illumination power of the laser projector 130). This in turn enables the imaging system 110 to achieve greater range in strong ambient illumination while staying within eye exposure limits.

In this embodiment, the structured light pattern 704 is reflected onto different sets of pixels 704 (e.g., within a region of pixels defined by the pixels within rows R1, R2, and R3) via the laser projector 130/steering device 140, while the pixels within the region of pixels are being scanned sequentially by the optical receiver 120A. As shown in FIG. 3A, for example, the imaging system 110 begins scanning the pixels row by row, pixel by pixel, in a sequential manner. The imaging system 110 initially scans pixel 702A within the first row (R1), while the structured light pattern 704A is reflected onto a first set of pixels (e.g., pixels (R1, C1), (R1, C2), (R2, C1), and (R2, C2)).

Figure 7A:
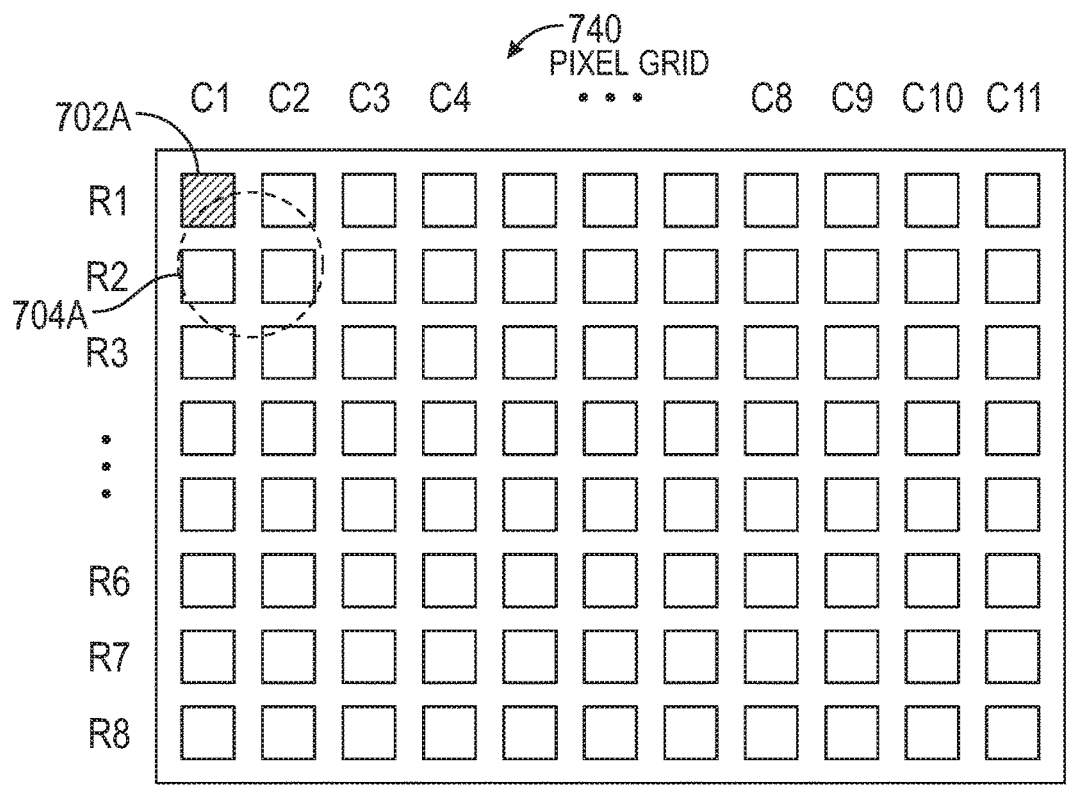
FIGS. 7A-7I illustrate another example sweep pattern of an imaging system across a scene, according to one embodiment.
Figure 7B:
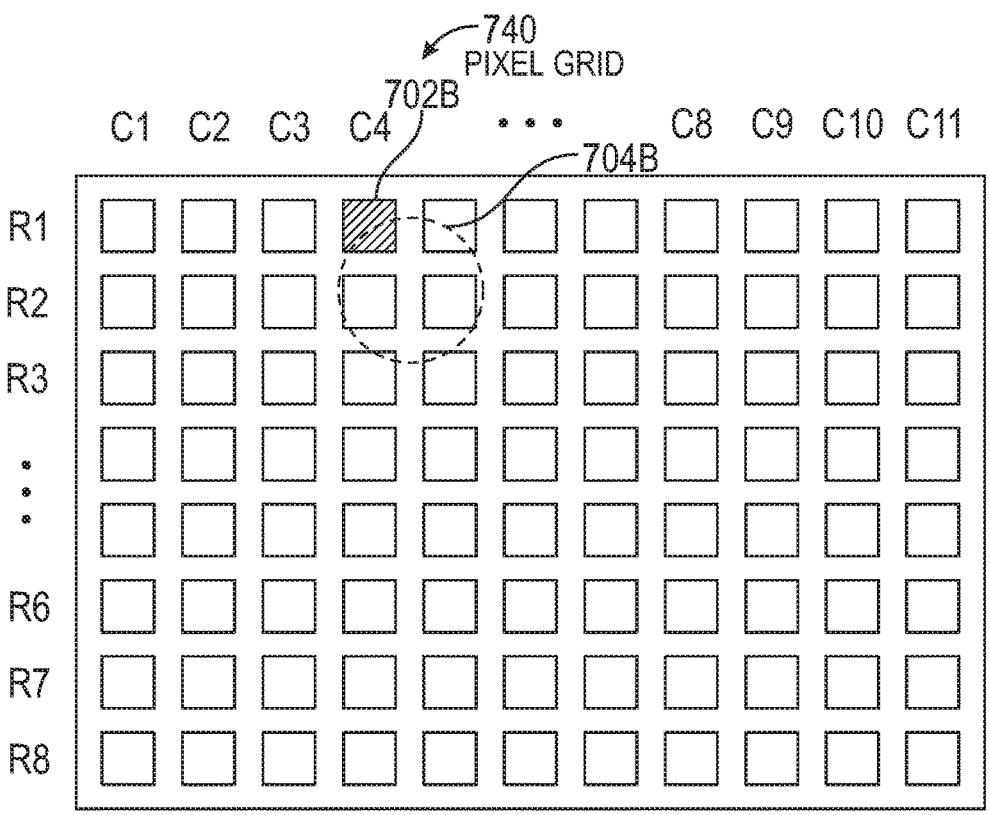
Figure 7C:
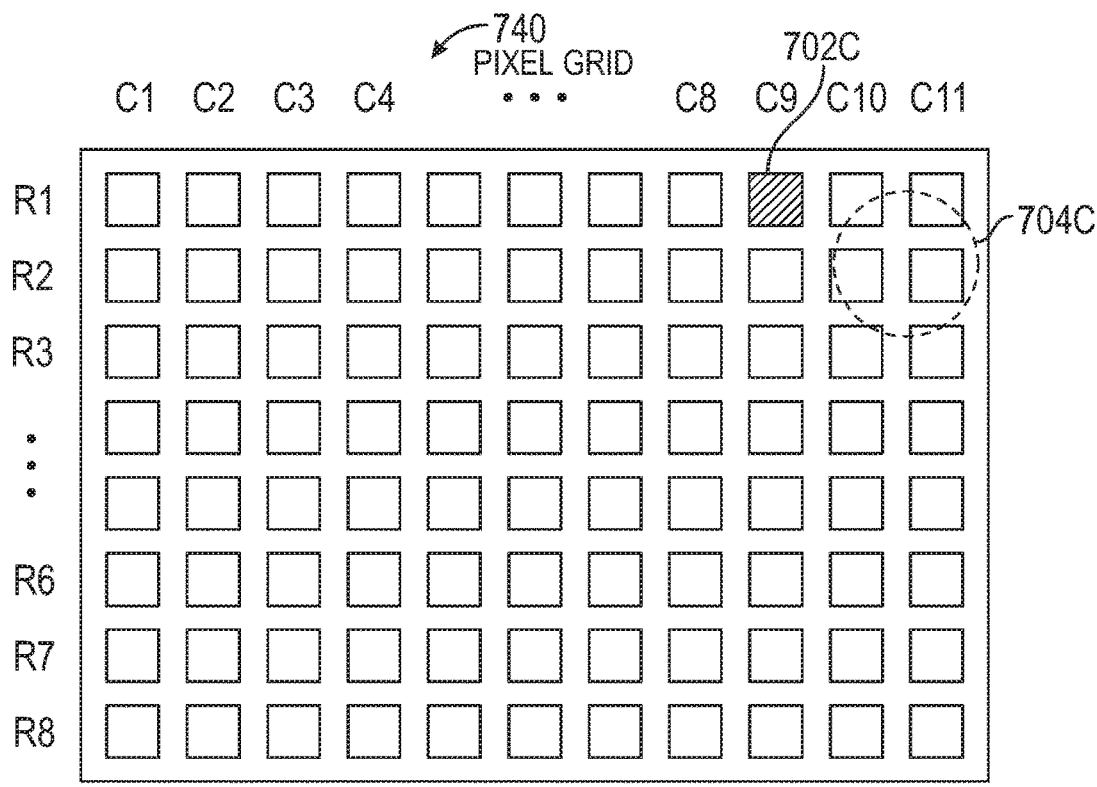

The imaging system 110 continues this scanning process, scanning each individual pixel in the first row (R1) in a sequential manner while also controlling the sweep of the structured laser pulse so that the structured light pattern 704 is reflected onto a different set of pixels (which may or may not include the pixel being scanned) at the same time instance that pixel is scanned. For example, as shown in FIG. 7B, at a subsequent time instance, the imaging system 110 scans pixel 702B within the first row (R1), while the structured light pattern 704B is reflected onto a second set of pixels (e.g., pixels (R1, C4), (R1, C5), (R2, C4), and (R2, C5)). Subsequently, as shown in FIG. 7B, the imaging system 110 scans pixel 702C within the first row (R1), while the structured light pattern 704C is reflected onto a third set of pixels (e.g., pixels (R1, C10), (R1, C11), (R2, C10), and (R2, C11)).

Figure 7D:
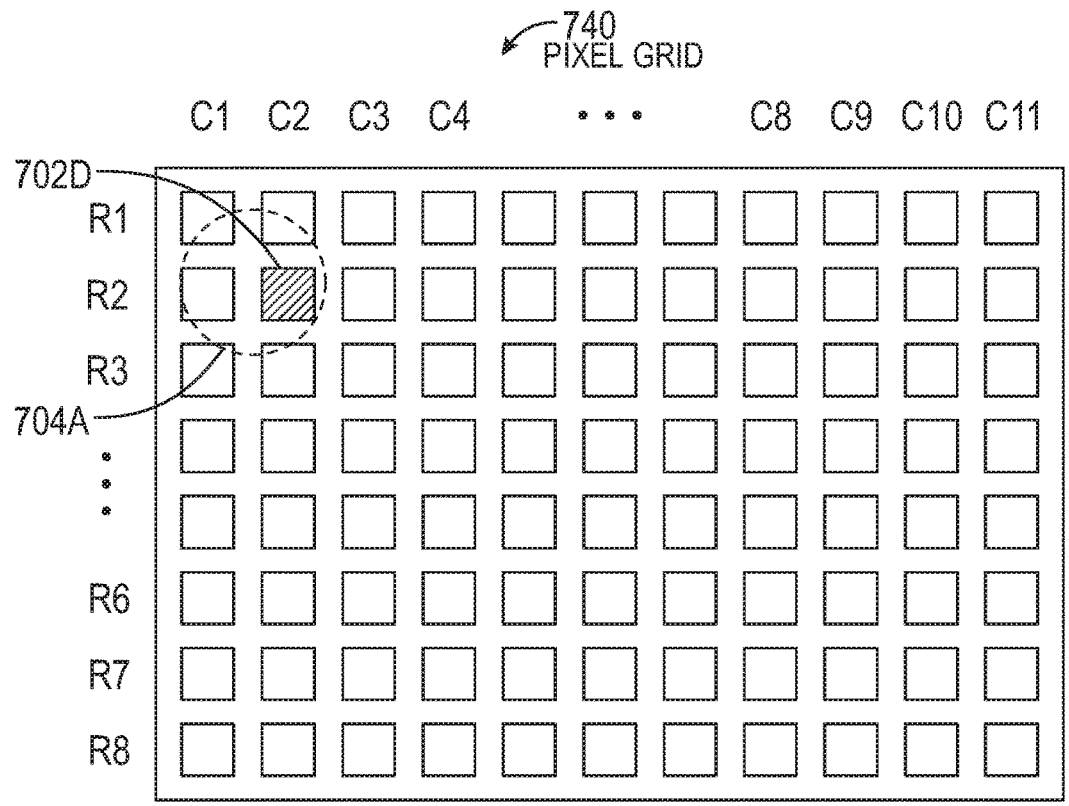
Figure 7E:
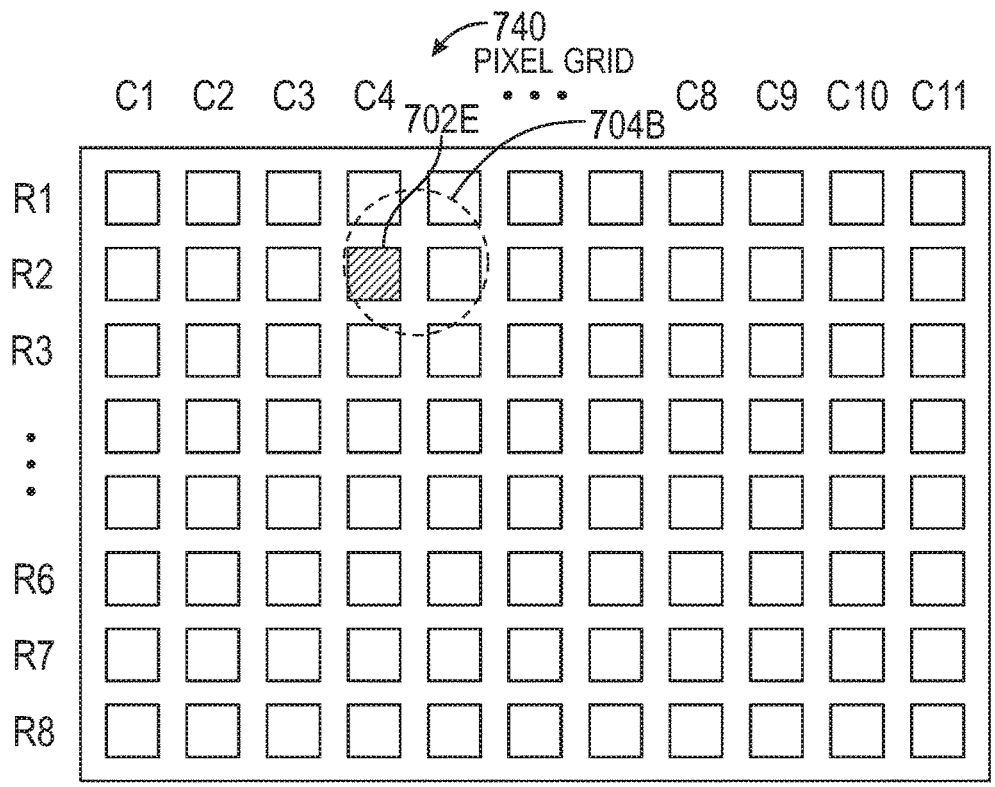
Figure 7F:
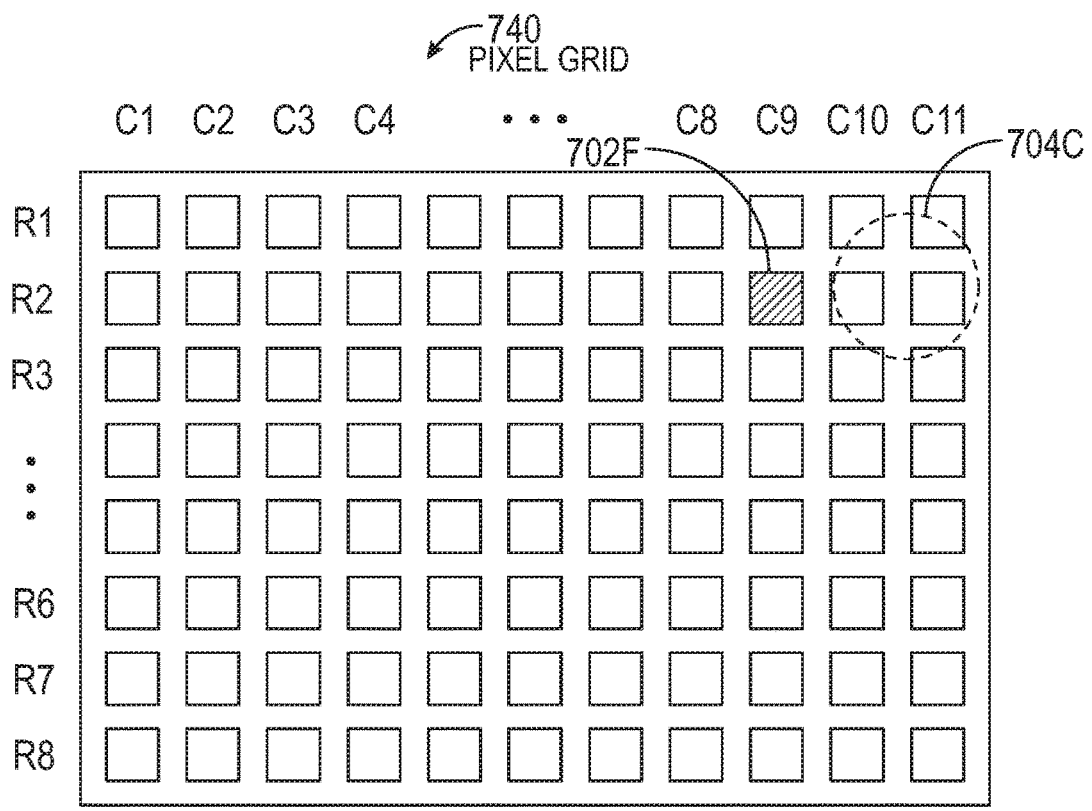

The imaging system 110 may repeat the same sweeping pattern across a region of pixels while pixels within the region of pixels are being scanned. For example, as shown in FIG. 7D, the imaging system 110 proceeds to the next row and scans pixel 702D, while the structured light pattern 704A is reflected onto the first set of pixels. Subsequently, as shown in FIG. 7E, the imaging system 110 scans pixel 702E within the second row (R2), while the structured light pattern 704B is reflected onto the second set of pixels. Subsequently, as shown in FIG. 7F, the imaging system 110 scans pixel 702F within the second row (R2), while the structured light pattern 704C is reflected onto the third set of pixels.

Figure 7G:
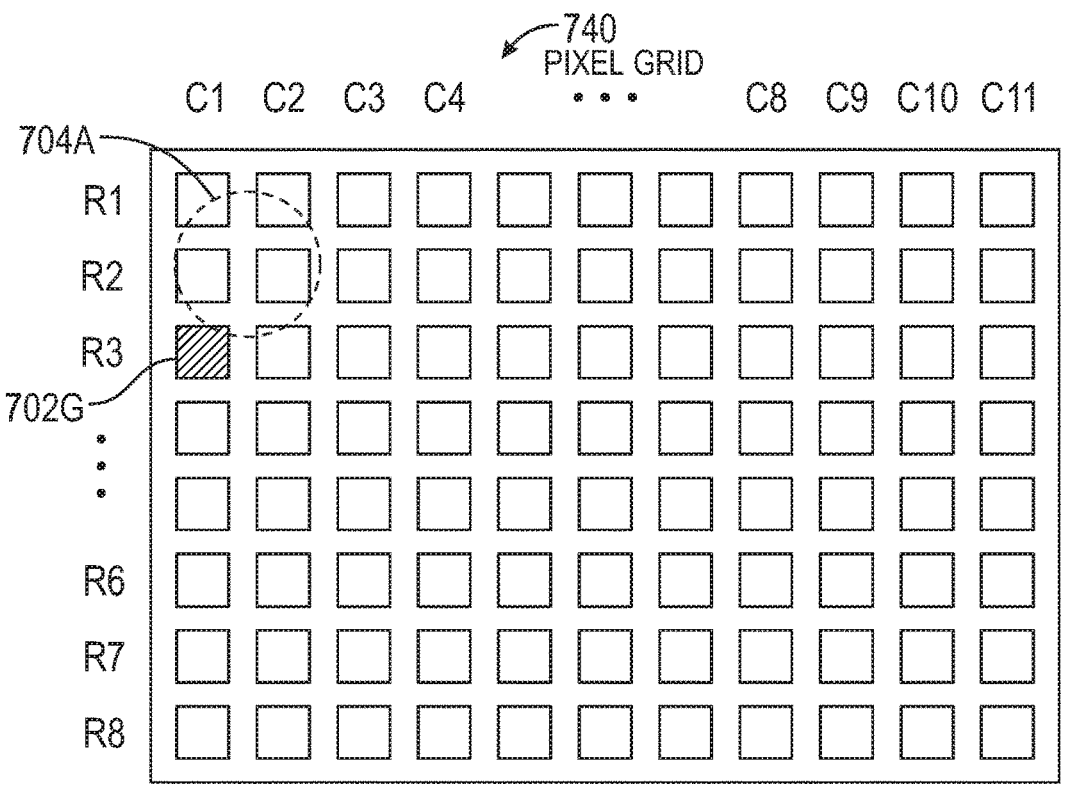
Figure 7H:
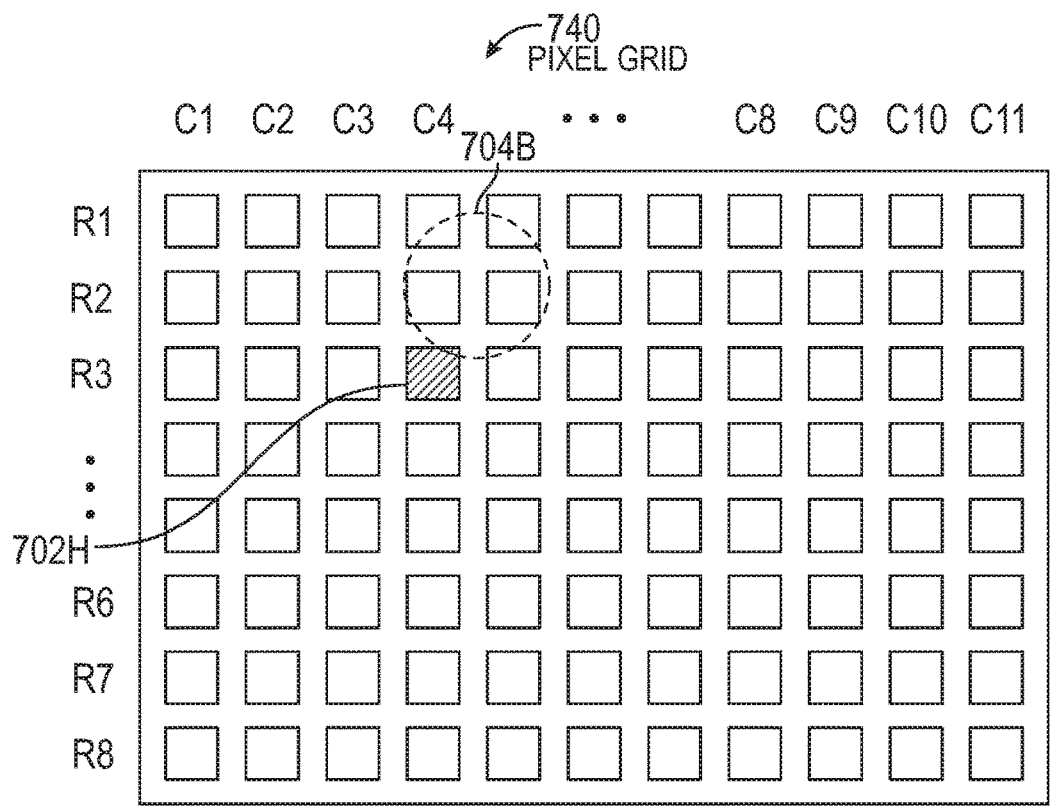
Figure 7I:
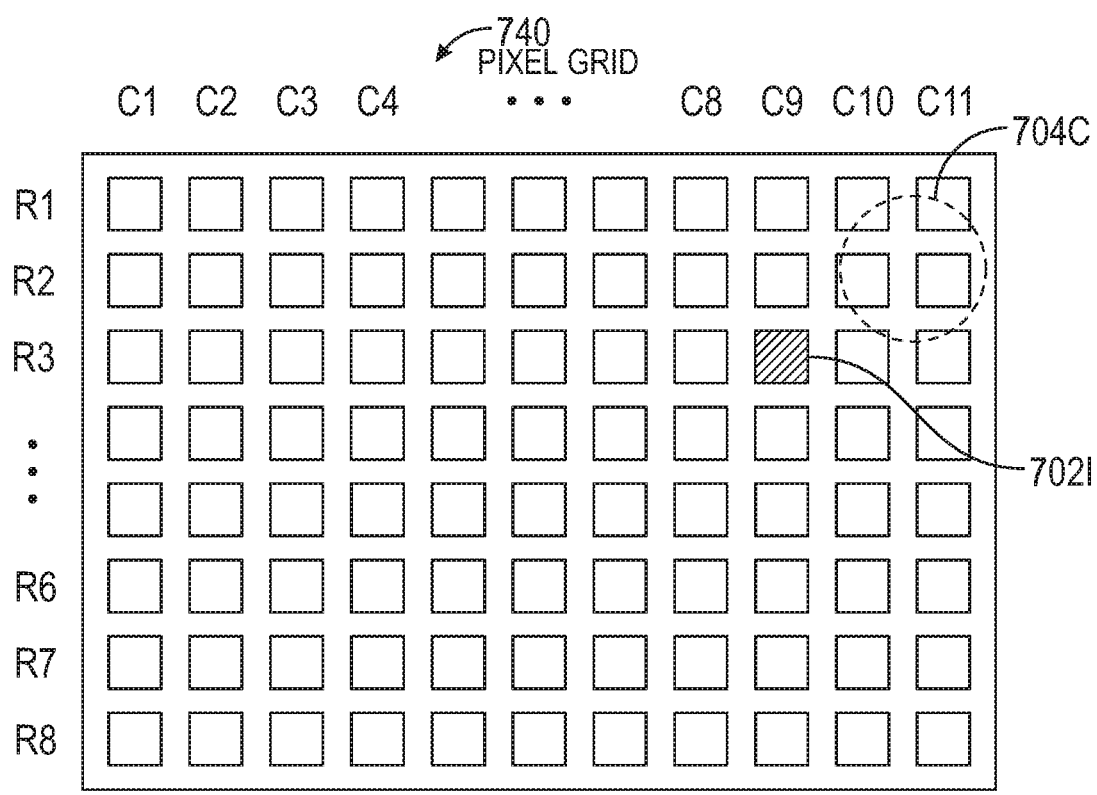

Again, the imaging system 110 may repeat the same sweeping pattern across the region of pixels while pixels within the third row, which is within the region of pixels, are being scanned. For example, as shown in FIG. 7G, the imaging system 110 proceeds to the next row and scans pixel 702G within the third row (R3), while the structured light pattern 704A is reflected onto the first set of pixels. Subsequently, as shown in FIG. 7H, the imaging system 110 scans pixel 702H within the third row (R3), while the structured light pattern 704B is reflected onto the second set of pixels. Subsequently, as shown in FIG. 7I, the imaging system 110 scans pixel 702I within the third row (R3), while the structured light pattern 704C is reflected onto the third set of pixels.

Once the last pixel in a given region of interest is scanned (e.g., pixel at (R3, C11)), the imaging system may use the same sweeping pattern across another region of pixels (e.g., pixels in rows R4, R5, and R6), while scanning the pixels in each row within the region of pixels. The imaging system 110 may continue this scanning process until the last pixel of the last row (e.g., pixel at (R8, C11)) is scanned.

Figure 8:
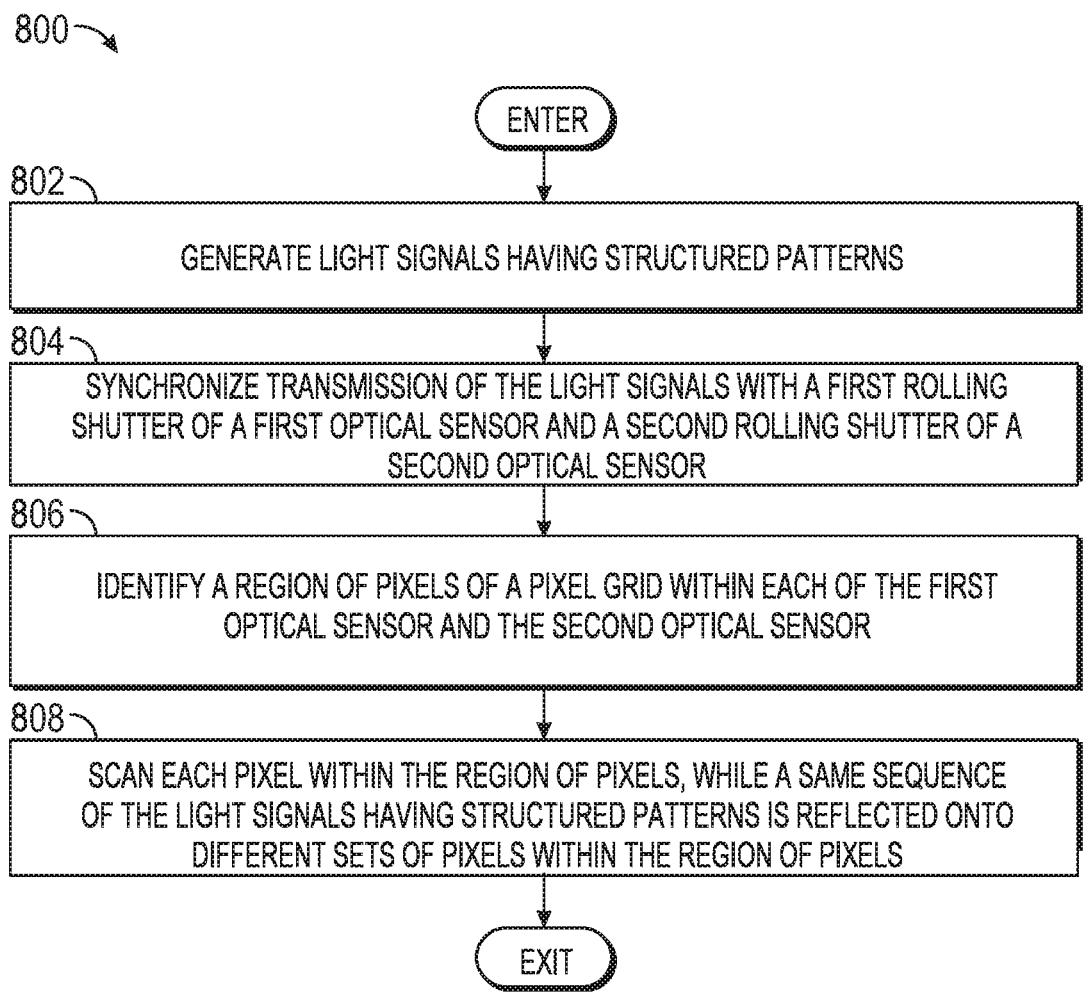
FIG. 8 is flowchart of a method for performing range imaging using an imaging system with two rolling shutters and synchronized laser projector, according to one embodiment.

FIG. 8 is flowchart of a method 800 for performing range imaging using an imaging system with two rolling shutters and synchronized laser projector, according to one embodiment. The method 400 may be performed by the imaging system (e.g., imaging system 110).

Method 800 may enter at block 802, where the imaging system generates light signals having structured patterns. As noted, the imaging system can use the laser projector 130 to generate one or more structured light pulses having particular structured patterns (e.g., spot, dot, line, etc.). At block 804, the imaging system synchronizes transmission of the light signals with a first rolling shutter (e.g., rolling shutter 210A) of a first optical sensor (e.g., optical sensor 212A) and a second rolling shutter (e.g., rolling shutter 210B) of a second optical sensor (e.g., optical sensor 212B).

At block 806, the imaging system identifies a region of pixels (e.g., pixels within rows R1, R2, and R3) of a pixel grid (e.g., pixel grid 740) within each of the first optical sensor and the second optical sensor. At block 808, the imaging system scans each pixel within the region of pixels, while a same sequence of the light signals having structured patterns is reflected onto different sets of pixels (e.g., at different time instances) within the region of pixels. The imaging system can determine a disparity (e.g., measure differences) between the scanned pixels of the first and second optical sensors to obtain a three-dimensional (3D) image of the scene (e.g., scene 230).

Figure 9:
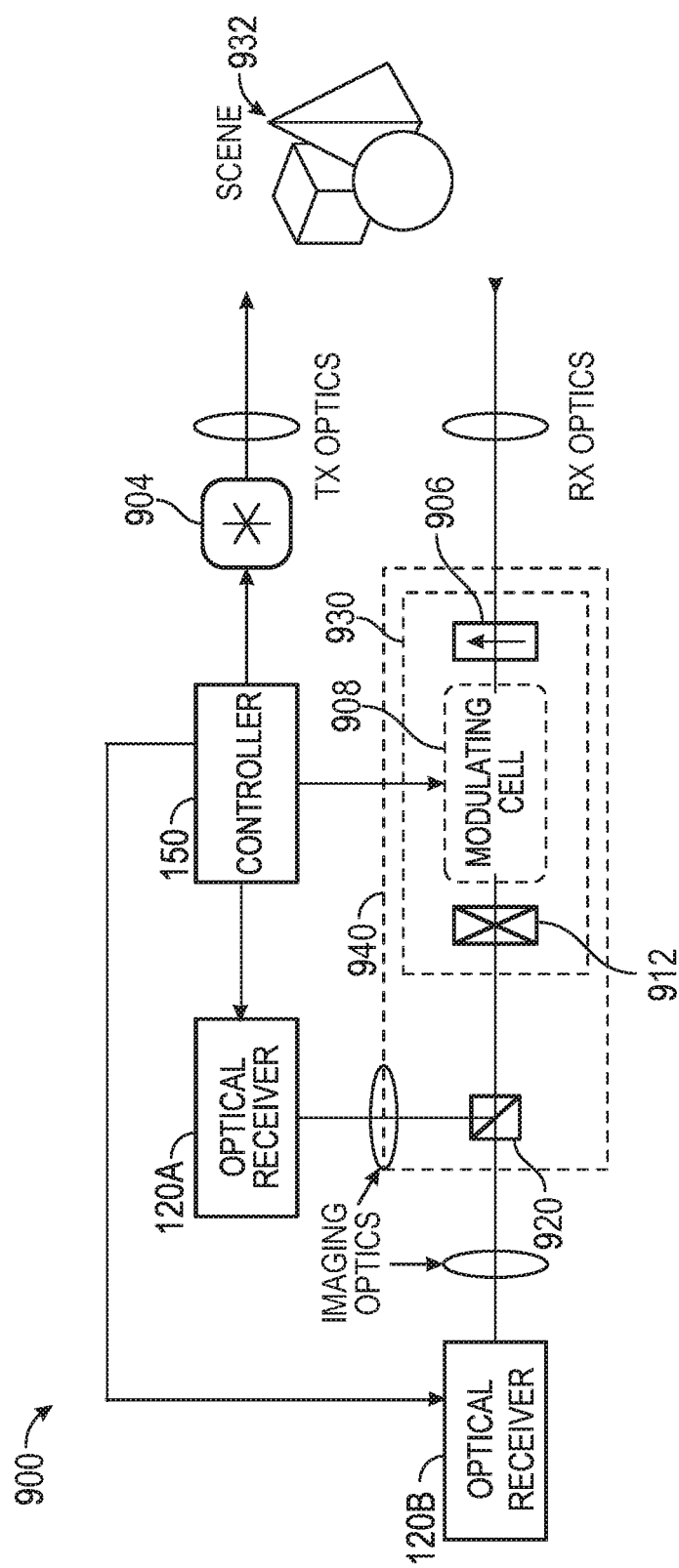
FIG. 9 illustrates another example imaging system, according to one embodiment.

FIG. 9 illustrates an example LIDAR-based imaging system 900 that can use a rolling shutter and synchronized scanning laser to increase range detection of a scene in strong ambient illumination situations, according to one embodiment. The LIDAR-based imaging system 900 can be implemented as a polarization-modulated flash LIDAR system. The LIDAR system 900 includes a controller 150, a laser source 904 (which may be similar to the projected laser 130), an intensity modulator 940, and optical receivers 120A and 120B. The intensity modulator 940 includes a polarization modulator 930 and a polarizing beam splitter 920 (e.g., analyzing polarizer).

Here, the controller 150 can trigger the laser source 904 to transmit a light pulse to the scene 932. The light pulse that is output from the laser source 904 may pass through TX optics (e.g., lens, mirrors, diffusers, etc.) before reaching the scene 932. The light pulse output from the laser source 904 is reflected by one or more objects in the scene 932. The reflected (or backscattered) light pulse from the scene 932 is initially received at the polarization modulator 930. In some cases, the reflected light pulse from the scene 932 can pass through RX optics (e.g., lens, filters, etc.) before being received at the polarization modulator 930.

As shown, the polarization modulator 930 includes a linear polarizer 906, a modulating cell 908 (e.g., Pockels cell), and a quarter waveplate 912. The linear polarizer 906 is generally used to reject unwanted polarized light from the reflected light pulse. When the reflected light pulse reaches the modulating cell 908, the reflected light pulse experiences a polarization-dependent phase retardation and a corresponding change in its polarization, based on a trigger from the controller 150. For example, the modulating cell 908 can rotate the linearly polarized light a certain degree(s) based on its ToF, converting it to an elliptical polarization. The quarter waveplate 912 converts the elliptical polarization into a linear polarization, and the polarizing beam splitter 920 splits the linearly polarized light between two different optical receivers 120A and 120B. The optical receivers 120A and 120B measure the respective intensities of the polarized components, and use the intensity information to compute the range(s) between the LIDAR system 900 and the object(s) in scene 932.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A structured light imaging system comprising:
a light source configured to transmit a plurality of laser pulses, each having a structured pattern, towards a scene;
a steering apparatus coupled to the light source and configured to spatially direct the plurality of laser pulses towards different regions of interest within the scene, wherein the steering apparatus comprises (i) a non-linear scanning system configured to output the plurality of laser pulses at a non-linear angular velocity and (ii) at least one anamorphic optical element that corrects the non-linear angular velocity of the plurality of laser pulses output from the non-linear scanning system, such that the plurality of laser pulses are spatially steered at a linear angular velocity;
an image sensor comprising a plurality of pixels and a rolling shutter, the image sensor being configured to receive reflected laser pulses, via the rolling shutter, from the different regions of interest within the scene; and
a controller electrically coupled to the light source, the steering apparatus, and the image sensor, the controller being configured to apply electrical signals to the image sensor to trigger the image sensor to read each of the plurality of pixels at a time instance when one of the laser pulses having the structured pattern is reflected onto the pixel from one of the different regions of interest within the scene.

2. The structured light imaging system of claim 1, wherein each region of interest within the scene has an area equivalent to an area of one of the plurality of pixels of the image sensor.

3. The structured light imaging system of claim 1, wherein the controller is further configured to synchronize a sweep rate of the plurality of laser pulses with a scan rate of the image sensor.

4. The structured light imaging system of claim 1, wherein:
the plurality of pixels comprise a plurality of horizontal regions of pixels; and
the image sensor is configured to sequentially read, via the rolling shutter, the pixels within each horizontal region of pixels.

5. A method for illuminating a scene with an imaging system comprising a rolling shutter and a structured light source, the method comprising:
generating a plurality of light signals, each light signal having a structured pattern; and
synchronizing a rolling shutter of an image sensor with the plurality of light signals, comprising:
spatially steering the plurality of light signals towards different regions of interest within a scene using (i) a non-linear scanning system configured to output the plurality of light signals at a non-linear angular velocity and (ii) at least one anamorphic optical element that corrects the non-linear angular velocity of the plurality of light signals output from the non-linear scanning system, such that the plurality of light signals are spatially steered at a linear angular velocity; and
scanning, with the rolling shutter, each pixel of a plurality of pixels within the image sensor at a different time instance to capture a different one of the plurality of light signals having the structured pattern reflected onto the pixel at the time instance.

6. The method of claim 5, wherein each region of interest has an area approximately equivalent to an area of one of the plurality of pixels.

7. The method of claim 5, wherein the plurality of light signals are spatially steered at an angular scan rate that is based on at least one of (i) a scanning rate of the image sensor and (ii) a field of view of a laser source that generates the plurality of light signals.

8. The method of claim 5, wherein:
the plurality of pixels comprise a plurality of regions of pixels; and
scanning each pixel of the plurality of pixels comprises sequentially scanning, via the rolling shutter, pixels in each of the plurality of regions of pixels.

9. A system comprising:
a first image sensor comprising a first rolling shutter;
a light source configured to generate a plurality of light signals, each having a structured pattern; and
a controller configured to synchronize the generation of the plurality of light signals with the first rolling shutter of the first image sensor, wherein:
in response to one or more electrical signals from the controller, the first image sensor is configured to scan, via the first rolling shutter, each pixel within a first region of pixels of the first image sensor, while a same scanning sequence of the plurality of light signals having the structured pattern is reflected onto different sets of pixels within the first region of pixels of the first image sensor; and
in response to one or more electrical signals from the controller, the first image sensor is further configured to scan, via the first rolling shutter, each pixel within a second region of pixels of the first image sensor, different from the first region of pixels, while the same scanning sequence of the plurality of light signals having the structured pattern is reflected onto different sets of pixels within the second region of pixels of the first image sensor.

10. The system of claim 9, further comprising a second image sensor comprising a second rolling shutter, wherein:

the controller is further configured to synchronize the generation of the plurality of light signals with the second rolling shutter of the second image sensor; and in response to the one or more electrical signals from the controller, the second image sensor is configured to scan, via the second rolling shutter, each pixel within a region of pixels of the second image sensor, while the same scanning sequence of the plurality of light signals having the structured pattern is reflected onto different sets of pixels within the region of pixels of the second image sensor.

11. The system of claim 10, wherein the controller is further configured to control a steering direction of each of the plurality of light signals to one or more regions of interest within a scene.

12. The system of claim 11, wherein the controller is further configured to determine range information of the scene based on pixel values of pixels within the first region of pixels of the first image sensor and pixel values of pixels within the region of pixels of the second image sensor.

13. The system of claim 11, wherein the controller is further configured to control the steering direction of each of the plurality of light signals via an acousto-optic deflector (AOD).

14. The system of claim 9, wherein the first region of pixels within the first image sensor comprises a plurality of horizontal regions of pixels.

15. The system of claim 14, wherein the same scanning sequence of the plurality of light signals having the structured pattern is reflected onto the different sets of pixels within the first region of pixels while the first image sensor sequentially scans, via the first rolling shutter, each of the plurality of horizontal regions of pixels, pixel by pixel.

16. The system of claim 14, wherein each set of pixels within the different sets of pixels comprises at least one pixel in each of the plurality of horizontal regions of pixels.

17. The system of claim 9, wherein:

the plurality of light signals having the structured pattern is reflected onto a first set of pixels within the different sets of pixels at a time instance that a first pixel within the first region of pixels is scanned by the first image sensor via the first rolling shutter; and the first set of pixels comprises the first pixel that is scanned by the first image sensor via the first rolling shutter at the time instance.

18. The system of claim 9, wherein:

the plurality of light signals having the structured pattern is reflected onto a first set of pixels within the different sets of pixels at a time instance that a first pixel within the first region of pixels is scanned by the first image sensor via the first rolling shutter; and the first set of pixels does not comprise the first pixel that is scanned by the first image sensor via the first rolling shutter at the time instance.

19. The system of claim 9, wherein:

the first region of pixels within the first image sensor comprises a first plurality of horizontal regions of pixels; and the second region of pixels within the first image sensor comprises a different, second plurality of horizontal regions of pixels.

20. The system of claim 19, wherein:

the same scanning sequence of the plurality of light signals having the structured pattern is reflected onto the different sets of pixels within the first region of pixels while the first image sensor sequentially scans, via the first rolling shutter, each of the first plurality of horizontal regions of pixels, pixel by pixel; and after each pixel within the first region of pixels has been scanned, the same scanning sequence of the plurality of light signals having the structured pattern is reflected onto the different sets of pixels within the second region of pixels while the first image sensor sequentially scans, via the first rolling shutter, each of the second plurality of horizontal regions of pixels, pixel by pixel.

* * * * *